Figure 2:
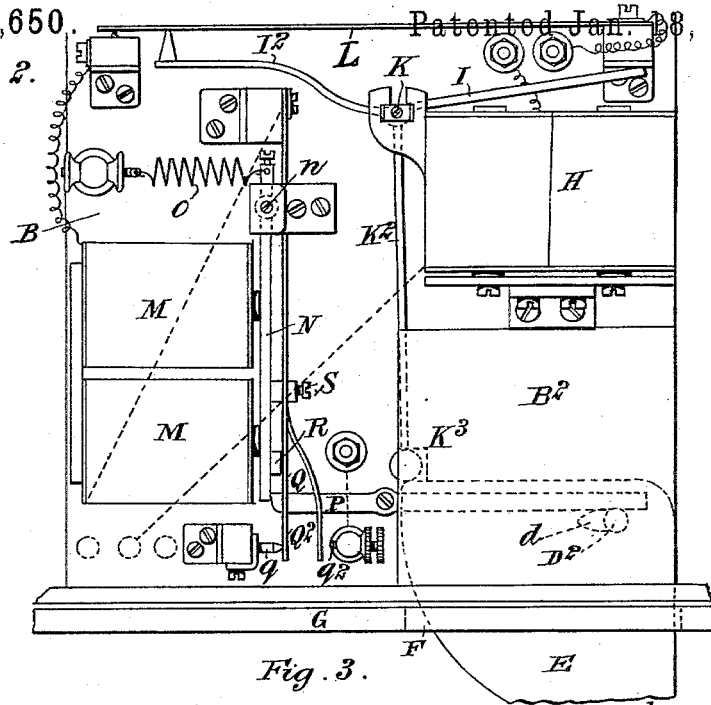

(No Model.) 7 Sheets—Sheet 1.
J. F. W. MORRIS & G. MUMFORD.
ELECTRIC LOCK AND SYSTEM OF ELECTRIC LOCKING FOR SECURING ADDITIONAL SAFETY IN RAILROAD SIGNALING.
No. 597,650. Patented Jan. 18, 1898.
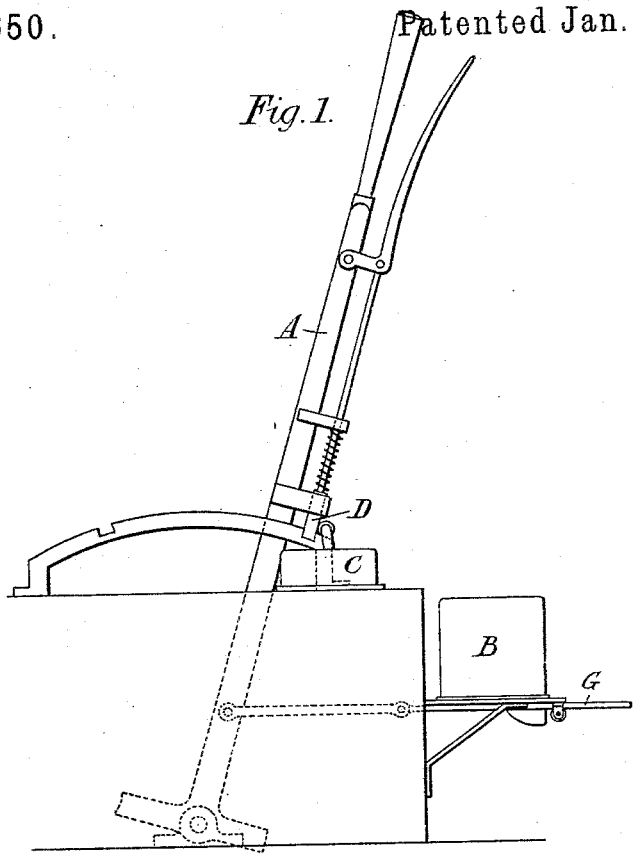
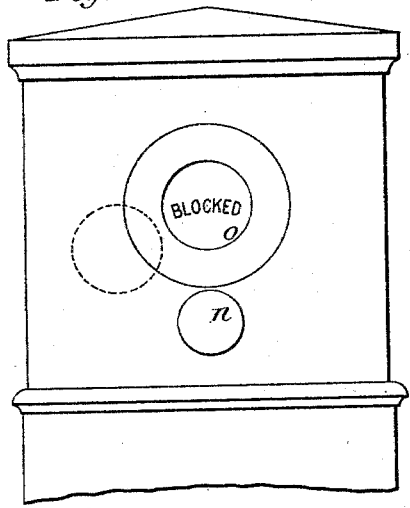
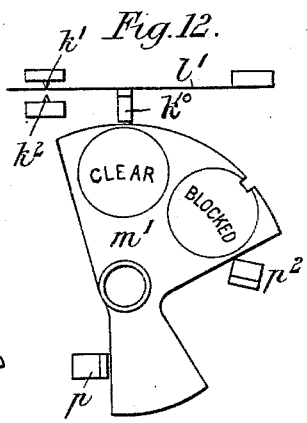
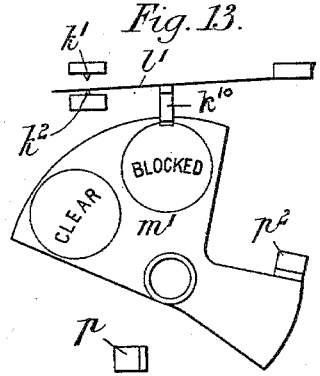
WITNESSES—
F. W. Wright
S. C. Connor
INVENTORS
J. F. W. Morris and Geo. Mumford
BY
Howson and Howson
THEIR ATTORNEYS (No Model.) 7 Sheets—Sheet 2.

J. F. W. MORRIS & G. MUMFORD.
ELECTRIC LOCK AND SYSTEM OF ELECTRIC LOCKING FOR SECURING ADDITIONAL SAFETY IN RAILROAD SIGNALING.

No. 597,650. Patented Jan. 18, 1898.

WITNESSES
F. W. Wright
A. C. Connor

INVENTORS
James F. W. Morris & Geo. Mumford
BY Howson & Howson
THEIR ATTORNEYS (No Model.) 7 Sheets—Sheet 3.
J. F. W. MORRIS & G. MUMFORD.
ELECTRIC LOCK AND SYSTEM OF ELECTRIC LOCKING FOR SECURING ADDITIONAL SAFETY IN RAILROAD SIGNALING.
No. 597,650. Patented Jan. 18, 1898.
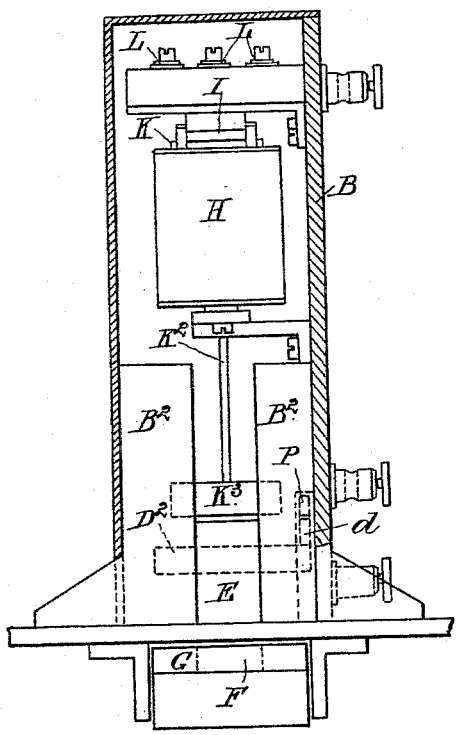
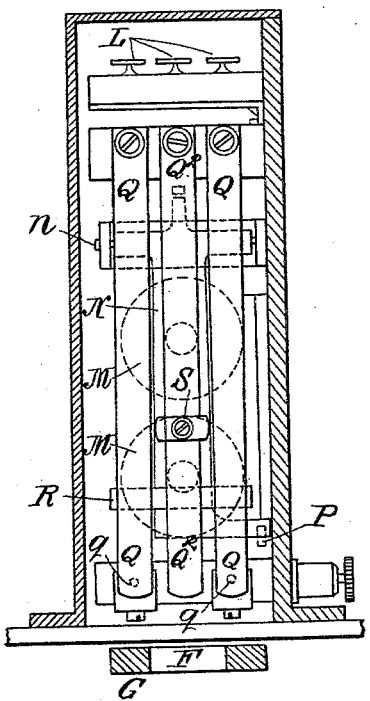
—WITNESSES—
—INVENTORS—
—BY—
THEIR ATTORNEYS—

(No Model.) 7 Sheets—Sheet 4.

J. F. W. MORRIS & G. MUMFORD.
ELECTRIC LOCK AND SYSTEM OF ELECTRIC LOCKING FOR SECURING ADDITIONAL SAFETY IN RAILROAD SIGNALING.

No. 597,650. Patented Jan. 18, 1898.

-WITNESSES-
F. W. Wright.
S. C. Connor

-INVENTORS-
James F.W. Morris & Geo. Mumford.
- BY
Howson & Howson
THEIR ATTORNEYS—

(No Model.) 7 Sheets—Sheet 5.
J. F. W. MORRIS & G. MUMFORD.
ELECTRIC LOCK AND SYSTEM OF ELECTRIC LOCKING FOR SECURING ADDITIONAL SAFETY IN RAILROAD SIGNALING.
No. 597,650. Patented Jan. 18, 1898.
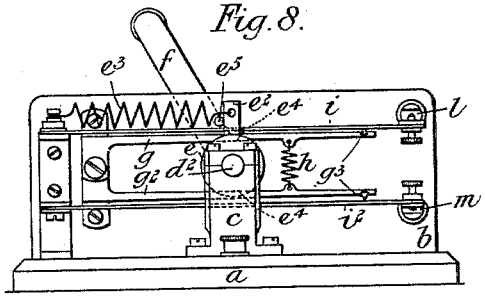
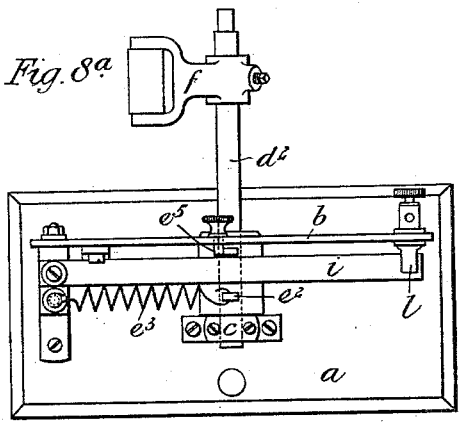
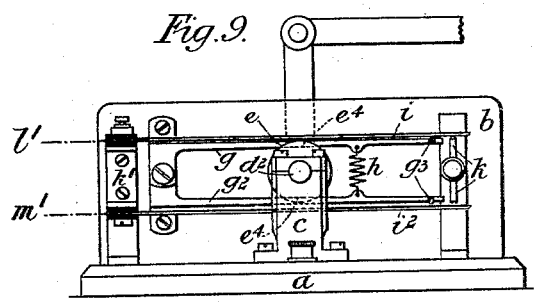
WITNESSES
F. W. Wright.
S. C. Connor
INVENTORS
J. F. W. Morris & Geo. Mumford
BY
Howson and Howson
THEIR ATTORNEYS

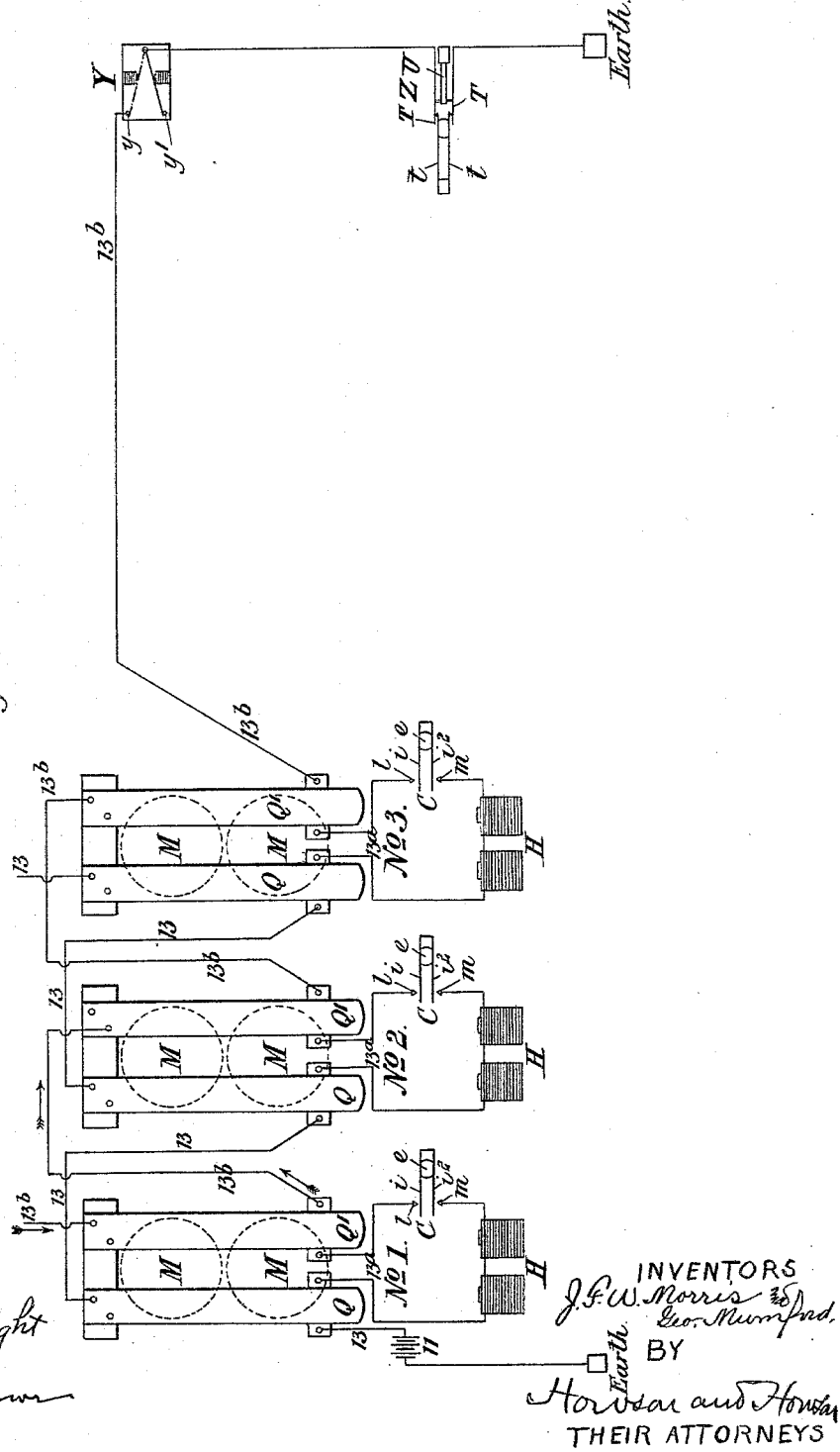

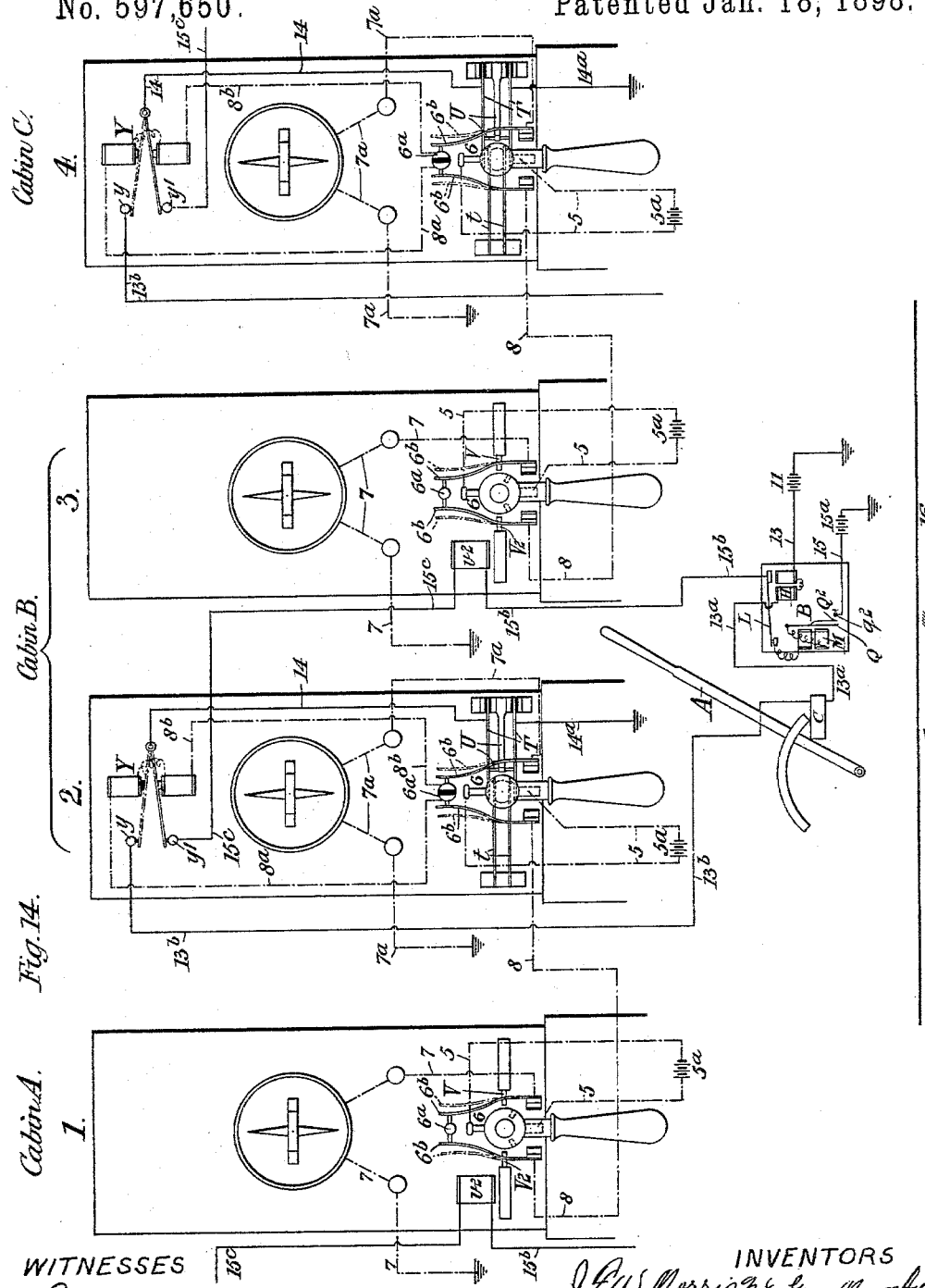

UNITED STATES PATENT OFFICE.

JAMES F. W. MORRIS AND GEORGE MUMFORD, OF LONDON, ENGLAND; SAID MORRIS ASSIGNOR TO WILLIAM SAMUEL TOTHILL MARTIN, OF SAME PLACE.

ELECTRIC LOCK AND SYSTEM OF ELECTRIC LOCKING FOR SECURING ADDITIONAL SAFETY IN RAILROAD SIGNALING.

SPECIFICATION forming part of Letters Patent No. 597,650, dated January 18, 1898.

Application filed October 16, 1896. Serial No. 609,152. (No model.)

*To all whom it may concern:*

Be it known that we, JAMES FREDERICK WALKER MORRIS, electrical engineer, and GEORGE MUMFORD, railway-signalman, subjects of the Queen of Great Britain and Ireland, residing, respectively, at 20 Grummant Road, Peckham, and at 166 Lordship Lane, East Dulwich, London, in the county of Surrey, England, have invented a certain new and Improved Electric Lock and System of Electric Locking for the Purpose of Securing Additional Safety in Railway Signaling, of which the following is a specification.

The improved locking mechanism according to our invention comprises a pivoted tumbler arranged in a metal case or frame and so adjusted that its normal tendency is to fall into a slot in a tappet or locking-bar whenever it presents itself in position to receive it. The tumbler is retained in this position by the armature of an electromagnet until such time that a current is passed through the said electromagnet and so permitting the tumbler to be pushed out of the slot in the tappet or locking-bar by the usual movement of the operating-lever. The parts of the lock in returning to their normal position may be assisted by springs, which act as electric contact makers and breakers in the general manipulation of the instrument.

The lock is designed to work in connection with point-detectors, fouling-bars, outlying points, level crossing-gates, and in connection with block-signaling instruments and the like, either singly or collectively, in the manner hereinafter described. When the lock is connected up to level crossing-gates, it will enable them to be controlled subject to the conditions of the section, so that the gates can be locked while the train is in the section or about to enter it and can be kept locked until the train has passed and the signalman at the nearest box releases them. When arranged as a lock-and-block appliance, the releasing of the lock can be done direct, as is usual, or preferably as follows: At each signal-box for up and down lines we arrange local circuits by placing in a convenient place a battery, one of the poles of which is connected to earth and the other connected up to certain points, fouling-bars, signals, gates, or other apparatus that it is desirable should be in some definite position to guarantee the safe passage of trains, eventually completing the circuit at the block-signal instrument in the box, which instrument is controlled by the stations in advance. These conditions being favorable and only when so the signalman can, with the aid of a suitable circuit-closer, complete a circuit which traverses an electromagnet, thereby unlocking certain point or signal levers, as may be required. If the instrument of the advance station indicates "line clear" or "train accepted," the signal can be placed to "danger," if necessary, in face of the approaching train. In existing systems the signal-levers being connected mechanically to the signaling instruments, the signal having been thrown up, "line clear" will be indicated at the rear station.

This invention enables the signal to be put to "danger," and when the train has been examined the signal can be lowered to allow it to proceed and without giving power to clear the road until the train has been properly disposed of. To complete the local circuit, it is preferable to use a contact attached to and to work with the catch-lever or drop-box, thereby dispensing with any additional movements by the signalman and a rendering it impossible to operate more than one contact at a time. Another local circuit is arranged in the signal-box somewhat after the manner of that mentioned above, which, traversing certain coils controlling the handles, dials, or other appliance, makes the display of these different instruments subject to the working of the lock. The former local circuit was closed on the indication of "line clear." This second local circuit only finds "earth" when "train on line" is shown or when the instrument is in its normal position. It is by this arrangement that an approaching train can be stopped, it being possible to replace the lever and reoperate it as often as may be required while the advance instrument indicates "line clear;" but as soon as the position of the advance instrument is altered to "train on line" this power ceases. If the lever be now returned, it becomes locked and at the same time closes a circuit and releases the handle or other arrangement and so enables the "train-passed" signal to be given. The lock can readily be attached to any block-signaling instrument already in use, and while retaining the advantages of such systems it introduces extra safeguards and improvements not hitherto attempted.

The above arrangement describing the stopping of approaching trains without operating the circuit, which gives "line clear," is due to the substitution of electrical for the usual mechanical devices, which, unfortunately for the requirements of signaling, operates at all times the same. Thus when a signal is thrown up in front of a train the mechanism is worked exactly as if the train had passed out of the section. The lock is inclosed in a casing, and there being no mechanical connections with the instruments above it is impossible for the signalman to tamper with it. It can be readily and cheaply put into operation, easily attached to any kind of a frame, and in some cases worked with existing tappets. It can be worked with advancee signal or with treadles, if necessary; but these are not advantages to our invention, a number of levers being worked as easily as one. While providing more safeguards than any existing systems, it is done without adding to the number of instruments in the signal-box and in some cases reducing them.

The application of our invention confers an important improvement into the existing block-signaling instruments, inasmuch as it guarantees that the proper signals shall be given and answered before unison between the boxes can be obtained, and it is not possible for the signalman to clear the rear section until he has passed the "train-on-line" signal to the advance station. It follows that the signalman cannot forget to give the "train-on-line" signal; otherwise the rear section must remain blocked. This removes one of the possibilities that has been the cause of many disasters.

Another important feature of this invention is that in the event of any accident occurring to the mechanism—such as broken wires, loose terminals, &c.—the result will not be attended with disaster through releasing of the signal, but will lock the signal and so rob any such failure of danger.

In order that our said invention may be fully understood, we shall now proceed more particularly to describe the same, and for that purpose shall refer to the several figures on the annexed sheets of drawings, the same letters and numerals of reference indicating corresponding parts in all the figures.

Figure 3:
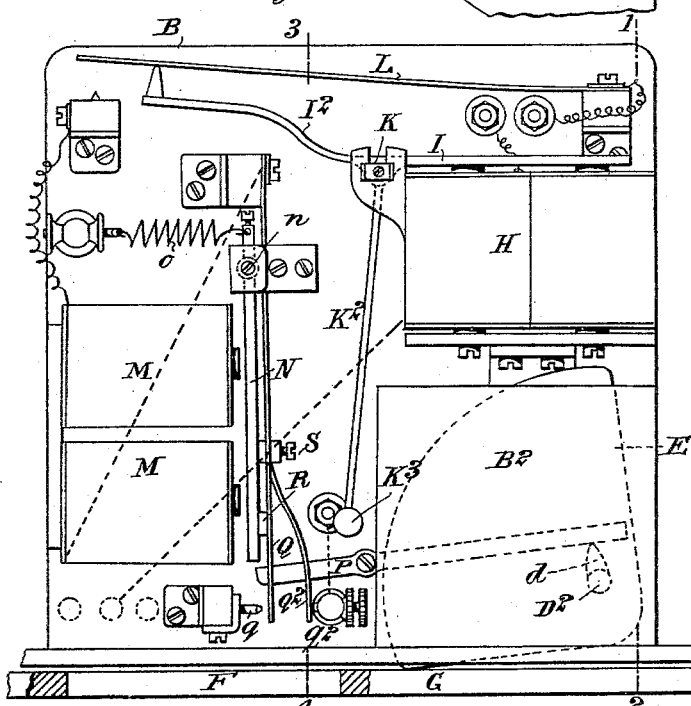
Figure 7:
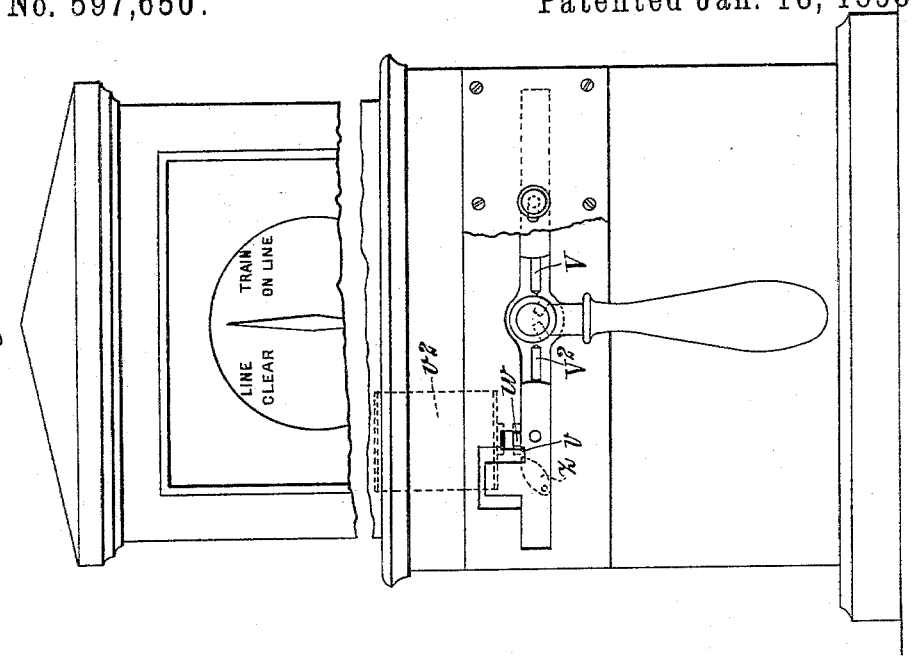
Figure 6:
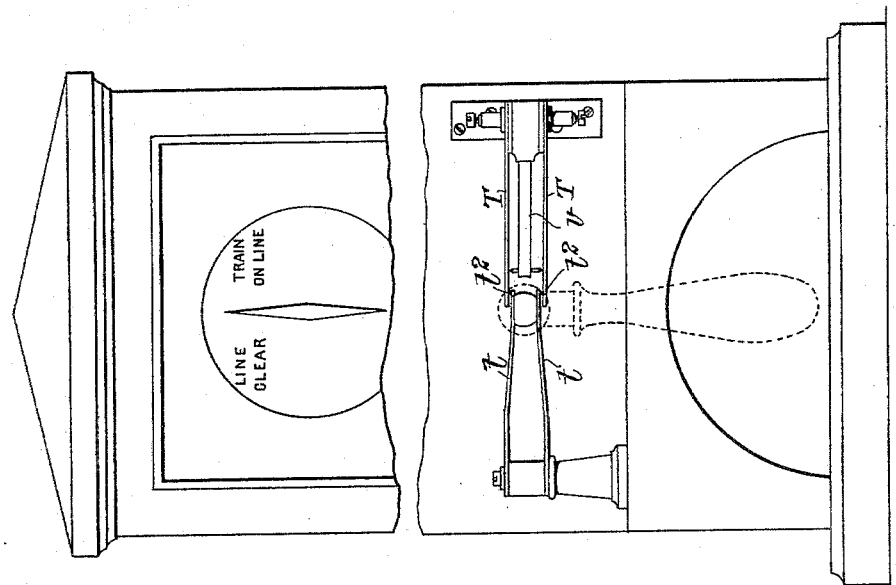

Figure 1 represents in elevation an arrangement of our improved locking device with a signal or point operating lever and locking-bar or tappet. Fig. 2 is a longitudinal vertical section of the lock, the parts being in their normal or unoperated positions. Fig. 3 is a similar view of the lock, showing the parts in their operated position. Figs. 4 and 5 are transverse vertical sections of the lock, taken, respectively, along the lines 1 2 and 3 4, Fig. 3. Fig. 6 is an elevation of a needle instrument for signaling trains to an advance station, and Fig. 7 is an elevation of a needle instrument for receiving trains signaled from a rear station. Figs. 8 and $8^a$ represent in elevation and plan, respectively, special apparatus operated by the spring-catch of point-lever for directing electric currents and making and breaking electric contacts; and Fig. 9 is a view similar to Fig. 8, showing a modification. Fig. 10 is a plan of an arrangement for directing and controlling electric currents for use where several levers are employed for transmitting to one advance station, which, while permitting repeated operations, render it impossible to substitute one lever for another. Fig. 11 represents in elevation an instrument for use in connection with advance subsections for indicating subsection clear or blocked. Fig. 12 shows the interior of the instrument with the indicator showing the subsection clear, and Fig. 13 is a similar view showing the indicator subsection blocked. Fig. 14 is a diagram illustrating the circuits controlling the locking mechanism and the signaling instruments and the contacts for completing and breaking the circuits.

A, Fig. 1, is an ordinary signal or point lever, B our improved lock, and C a contact-maker operated by the drop-box or spring-catch D of the lever.

The lock mechanism is inclosed in a box or casing B, Figs. 2 and 3, in the interior of which are secured two metal blocks $B^2$, in which is mounted a spindle $D^2$, carrying a tumbler or cam E, which by gravitation assumes the normal position shown in Fig. 2, engaged in a slot or opening F in or otherwise engaged with the tappet or locking-bar G, thereby securing the said tappet or locking-bar against longitudinal movement.

H are the coils of an electromagnet, the armature I of which is pivoted in a self adjusting or sliding bearing K and has a depending arm $K^2$ and block $K^3$, which engages with the cam or tumbler E and in notches in the blocks $B^2$ to retain it in its normal position. The adjustable bearing K is provided for the purpose of protecting the delicate electrical mechanism from injury. For instance, should the signalman endeavor to operate a lever that is locked the bearing K would yield readily to the force used, the block $K^3$ would become wedged in the notches of blocks $B^2$, and in conjunction with $B^2$ would receive the full force of the blow or thrust, and consequently no possible injury could be done to the delicate spindle pivoted at K. The armature also has an extension I² for acting on a spring or springs L for making and breaking or directing electric currents in connection with interlocking and controlling circuits.

M is an electromagnet for controlling the operations of the signalman. The armature N of this magnet is pivoted at $n$ and is connected at its upper end to a spring O, tending to hold the armature away from the pole of the magnet.

P is a lever which in its normal position rests at one end on the spindle D² and its opposite end is in position to prevent the armature N from moving outward under the action of the spring O.

On the spindle D², which carries the tumbler or cam E, is a pin or projection $d$, which, when the tumbler is moving into the position shown in Fig. 3, turns the lever P on its fulcrum, so as to remove its end out of the range of the armature N and admit of the end of the armature passing over the end of the lever P and so lock the said lever in this position, as shown in Fig. 3.

Q Q² are springs for making and breaking contact with contact-points $q$ $q^2$ for directing electric currents, the springs Q making contact with the points $q$ during the time the armature N is held by the lever P, as shown in Fig 2, for the purpose hereinafter described, and the spring Q² making contact with $q^2$, as shown in Fig. 3, when the armature N is released by lever P, thus permitting the spring O to operate so as to cause the armature and springs to take up the positions shown in Fig. 3. The springs Q bear on an insulated piece R on the armature, and the spring Q² is adjustable by means of a screw S nearer to or farther from the contact-point $q^2$, as required.

In connection with an ordinary needle-block instrument, such as is shown by Fig. 6, on which all trains would be signaled to an advance station, we employ a "polarized relay," which is affected by certain currents received from the advance station, but is not affected by the currents sent, when this instrument itself is operated. To this instrument we attach additional springs T, which are operated by the two ordinary springs $t$ when the handle is moved, on which springs $t$ we provide insulator-blocks $t^2$, against which the springs $t$ bear. When the handle is in its normal position, the two springs T are in contact with the pillar U and an electric current can pass from one spring to the other, but when the handle is moved in either direction the said springs T are moved by the insulator-blocks $t^2$ out of contact with the pillar U, and the current is broken.

In connection with another ordinary needle-block instrument on which all trains from a rear station would be received we provide a bolt V, Fig. 7, by which we secure the handle in the "line-clear" position, and with a bolt V² to secure the said handle in the "train-on-line" position. In the bolt V² is a slot $r$ to receive the end $w$ of the armature of the electromagnet $r^2$ in the instrument and so prevent the movement of the bolt V² until a current is passed through the magnet. $z$ is a gravity-latch which when the armature end $w$ is withdrawn from the slot $v$ keeps it from returning to the slot till the bolt is operated.

The apparatus illustrated by Figs. 8 and 8ª is that which we prefer to employ for making and breaking or directing electric currents by the movement of the spring-catch of the point or signal lever and comprises a base-plate $a$, from which projects upward a side plate $b$ and a bearing-block $c$, in which is mounted a spindle $d^2$, carrying a cam $e$ and an operating-lever $f$. Pivoted to the side plate $b$ are two levers $g$ $g^2$, arranged to bear on diametrically opposite sides of the periphery of the cam $e$, at parts of which the surface is flat, as indicated by dotted lines $e^4$, the two levers $g$ and $g^2$ being held in contact therewith by a spring $h$. Each lever $g$ $g^2$ carries a block $g^3$, of insulating material, on which bear two springs $i$ $i^2$, carried by but insulated from the plate $b$. The cam $e$ is provided with an arm $e^2$, connected to a spring $e^3$, which tends to maintain the cam in its normal position against a stop $e^5$.

$l$ and $m$ are contact-points with which the springs $i$ $i^2$ may by the movement of the cam $e$ be caused to make contact, so as to direct the electric current in the direction required.

When attached to points, gates, signals, or the like, the arrangement Fig. 9 is preferred, in connection with lock or controlling circuits, with the object of determining that they are in a certain definite position. The contact is so fitted that a current entering at $l'$ traverses spring $i$ through pillar $k$ by spring $i^2$ and away by $m'$. It is obvious that the slightest deviation from the position required would cause the circuit to be broken at both points of pillar $k$.

Our improved locking device can be used in connection with points, fouling-bars, gates, signals, and the like as an interlocking apparatus and in combination or not with block-signaling and like instruments either singly or collectively, as may be required.

When the locking device is combined with block-signaling instruments, the combination constitutes a "lock-and-block" instrument which will fulfil all the conditions and guarantee all the safeguards hitherto associated with lock-and-block apparatus of the best kind, but with important improvements.

For convenience of describing the operation of our invention we will suppose there are three signal-cabins, which we will refer to as A, B, and C, and assume cabin A to control the advance section, cabin B the one in which we are situated, and cabin C to be at the entrance of the rear section. It follows, of course, that although this description is chiefly confined to cabin B the same conditions would prevail at the other two cabins or any number of additional cabins. This will be better understood by reference to diagram Fig. 14. 1, 2, 3, and 4 are needle-block instruments of ordinary construction situated as follows: No. 1, a receiving instrument in cabin A; No. 2, a sending instrument, and No. 3 a receiving instrument in cabin B; No. 4, a sending instrument in cabin C. The wires 5 are the connections between battery $5^a$ and current-reverser 6. $6^a$ is a pillar which ordinarily allows a current to pass from one spring $6^b$ to the other spring $6^b$; but in instruments 2 and 4 an insulator is introduced in the pillar; 7, the earth-wire, and 8 the line-wire to distant station. These instruments are of known construction. The ordinary circuits connected therewith are indicated by dotted lines, and the figures relating to one instrument apply equally to any of the four.

The circuits in connection with special locking system are those indicated by full lines. A is the signal-lever, C special contact, and B the lock. 13 $13^a$ $13^b$ are the conductors of the lock-circuit, the conductor 13 running from battery 11 to coils H, conductor $13^a$ to special contact C, where it is normally broken, and the conductor $13^b$ to the contact $y$ of the polarized relay Y, which may be of ordinary construction. The lock-circuit is closed only while the "line-clear" indications are received from an advance station, contact then being made at point $y$, so allowing a current to pass by conductor 14 to springs T and pillar U through the wire $14^a$ to earth. The controlling-circuit is shown complete and described only in relation to instruments 2 and 3, cabin B, passing from battery $15^a$ by conductor 15 to point $q^2$, thence to spring $Q^2$, which contact is normally broken and is completed only on operating the lock, (see Figs. 2 and 3,) from $Q^2$ to coils M, spring L, and thence through conductor $15^b$ to instrument No. 3, traversing coils $v^2$, (see Fig. 7,) and through conductor $15^c$ to instrument No. 2 to relay Y, (this circuit being closed when contact is made at point $y'$, the said contact being made when "train-on-line" indications are being received or when the instrument resumes its normal position,) thence by conductor 14 to springs T, pillar U, and conductor $14^a$ to earth, as for lock-circuit. 16 is a line of railway on which trains are assumed to proceed in the direction indicated by the arrow.

The manner of working our improved apparatus may be described as follows: Suppose a train to be approaching C cabin. The signalman at this cabin will signal to cabin B the "be-ready" or "warning" signal. If the signalman at B is ready, he will acknowledge it by moving the handle of the receiving instrument No. 3, Fig. 14, and peg over the handle by the bolt V, so that the needle points to "line clear." A current now passes from No. 3 instrument, cabin B, Fig. 14, to No. 4 instrument, cabin C, by conductor 8, to spring $6^b$, pillar $6^a$, the insulator of which prevents the current crossing direct from one to the other of the springs $6^b$, as is usual, the current being thereby caused to traverse conductor $8^a$ and coils of relay Y, conductor $8^b$, to the second spring $6^b$, then through the instrument itself to earth by conductor $7^a$. It will be seen that when the current-reverser of No. 4 is operated one of the springs $6^b$ must take up the position shown by dotted lines and no current can be passed through relay Y by operating this instrument. The current passing through the relay Y will deflect the armature thereof to the position shown by dotted lines, the said armature thereby making contact at point $y$, so closing the local lock-circuit at cabin C. So far as cabin B is concerned the signalman at cabin C by lifting spring-catch of lever A closes the circuit in special contact C, a current passing from battery 11 by conductor 13 through coils H, conductor $13^a$, special contact C, conductor $13^b$, contact $y$ of relay Y, and thence by way of conductor 14, springs T, pillar U, and conductor $14^a$ to earth. The armature I, Fig. 2, being thus attracted, causes the arm $K^2$, blocks $K^3$, extension $I^2$, and springs L to take up the positions shown in Fig. 3, the lever being unlocked. When the train passes cabin C, the signalman there will signal to cabin B "train entering section." The signalman at B cabin will acknowledge and peg the handle of the instrument No. 3 over by means of the bolt $V^2$, so that the needle points to "Train on line." The current now being reversed traverses 8 to cabin C, deflecting the armature of relay Y to point $y'$, thence to earth, as described, breaking the local lock-circuit at $y$.

To secure the handle in the "train-on-line" position, the bolt $V^2$ must be moved to the right, so that the end of the bolt enters a recess (indicated in dotted lines) in the barrel of the handle. This will bring the slot $v$ directly under and the gravity-latch $z$ against the armature end $w$, whereby the said latch is pushed aside out of the slot $v$ and the armature end falls into the said slot and secures the bolt in position until an electric current is next passed through the coils of the electromagnet $v^2$, as hereinafter explained. The armature is then removed from the slot, and the gravity-latch, thus left unsupported, falls so as to project partly into the slot and prevent the reëngagement therewith of the armature. The bolt $V^2$ can then be moved back to the left when it is desirable to send the "train-arrived" signal to the rear cabin. The magnet $v^2$ is only energized momentarily, the armature being held out of the slot by the gravity-latch until such time as the bolt $V^2$ is moved back to the left, when the handle would be released and the mechanism stand, as shown in Fig. 7, ready for reoperation. The train now being in the section the signalman at B will give the "be-ready" signal to cabin A. The signalman there will acknowledge signal and peg the handle of his receiving instrument No. 1 over in the position to indicate in his own cabin and in cabin B "line clear." A current now runs from instrument No. 1, cabin A, to No. 2 instrument, cabin B, in exactly the same manner as previously explained in relation to cabin C. The signalman at cabin B can now lower his signal that the train may enter advance section. He thereupon lifts the spring-catch D of the lever A, (see Fig. 1,) thereby closing the circuit by contacts $l$ and $m$, Fig. 8, and passing a current through coils H, Fig. 2. The armature I being thus attracted causes the arm $K^2$ and block $K^3$, extension $I^2$, and springs L to take up the position shown in Fig. 3. The lever A can now be pulled, the movement of lever shifting the tappet or locking-bar G and turning the tumbler or cam E into the position shown in Fig. 3, and the pin $d$, acting on the lever P, releasing the armature N of the controlling-magnet M, which armature, by the force exerted by spiral spring O, takes up the position shown in Fig. 3, thereby moving the springs Q out of contact with the point $q$ and placing the spring $Q^2$ in contact with the point $q^2$. The parts remain in this position till a current is passed through the coils of the magnet M. It may be here stated that the spring-contacts Q and $q$ perform no function in connection with the system, as shown in Fig. 14, except when the modification illustrated by Fig. 10 and hereinafter explained is introduced. Should the signals not come properly off, the lever can be returned and a second trial made, or should it be necessary for the signalman at B cabin to stop the approaching train he can put the signals to "danger" and lower them again repeatedly, if necessary, during the whole time the advance instrument indicates "line clear." During these repeated movements the armature N with its attachments remain unaffected and still retain the position shown in Fig. 3. This facility is due to the substitution of an electrical controlling apparatus for the mechanical contrivance usually employed and which for the requirements of railway signaling always perform the same operations no matter for what purpose the lever may be returned. When the train passes cabin B, the signalman there signals to cabin A "train entering section," which the signalman at cabin A acknowledges and pegs the handle of his instrument over, so that it indicates in his own cabin and in cabin B "train on line." The current now being reversed traverses 8 to No. 2 instrument, cabin B, through the relay Y, as previously explained. Contact being made at the various places hereinafter mentioned, a current will pass through, as set forth by diagram Fig. 14. Should the lever A be returned now, it will be locked, so that the signalman at B cabin can no longer release by his spring-catch D, the relay not making contact at the right point. When the signalman at cabin B altered his instrument to indicate "train on line" in his own cabin and in cabin C, it was secured in that position by the bolt $V^2$, which in its turn was secured by the armature end $w$ entering the slot $r$, Fig. 7. It is now that the controlling-circuit comes into operation, as will be understood by reference to Fig. 14. The controlling-circuit is normally broken between $Q^2$ and $q^2$ and can only be connected up by operating the tappet or lock-bar G, and the circuit at springs L having been broken by the attraction of armature, Figs. 1, 2, and 3, can only be remade by relocking the lever. Hence by these provisions the operation of the lever is guaranteed and its relocking insured. Otherwise no current could pass and No. 3 instrument would remain locked by armature end $w$ and no "train-passed" signal could be given. The controlling-circuit is normally closed by relay Y at point $y'$ and broken every time the armature of the relay is deflected to point $y$. Hence while the lock-circuit is complete the controlling-circuit cannot be completed, and vice versa.

The circuit is made and broken by the spring or springs L, Figs. 2 and 3, which spring breaks the circuit when the lock is released and completes the circuit when the lock resumes its normal "locked" position. The circuit is also made and broken by the spring $Q^2$, which, as will be seen by Fig. 2, breaks the circuit when the armature N is held by catch-lever P, but completes the circuit when the armature N is in the position shown in Fig. 3. This circuit can be completed and broken at four places—namely, at the springs L, the spring $Q^2$, Fig. 2, the springs T, Fig. 6, and at the relay. It does not matter in what order these contacts are made to complete the circuit, but as soon as it is completed the current passes through the coils of the magnet M and attracts armature N, and with it the springs Q and $Q^2$, breaking its own circuit at $q^2$ and automatically locking itself by the action of lever $p$, which again takes up the position shown in Fig. 2. The same current simultaneously passing through coils of the magnet $v^2$, Fig. 7, in the receiving instrument withdraws the armature $w$ from slot $v$ and is kept from returning to the slot by the gravity-latch $z$. The signalman at cabin B is then free to signal to cabin C "train passed."

The controlling-circuit, like the lock-circuit, can be made to include point-signals and the like, if desired, working in such a manner that the signal or signals which have been put to the safety position for the train to proceed shall return to the danger position, or parts that have been operated shall be reset before the controlling-circuit shall be complete. The locking mechanism may, if desired, be separate from the controlling mechanism and be worked by one lever, the controlling mechanism being worked by a separate lever. For interlocking, the controlling-section can be dispensed with entirely.

Where keys and other special appliances are employed and the apparatus is stated to work with the greatest precision and be an effectual check upon the actions of the signalman, there is nothing to prevent him using these different appliances to work them as he pleases, whereas in working according to our system special appliances—such as keys, movement of levers, or the like for working the apparatus when the ordinary operations have only been imperfectly carried out—are dispensed with. We also discriminate between permission for a train to enter a section and when one has actually entered.

When permission to enter is asked for and given by the "line-clear" indications, the request to enter can be canceled freely. Should the train pass and "train-entering-section" signal be given, canceling becomes impossible, and it is absolutely necessary for a man who has received a "train-entered-section" signal to deliberately and properly dispose of it before he can be in the position to accept another.

The explanation hitherto given applies to the simplest form of signal-cabin where one lever only is required to be operated. At junctions, terminal stations, and the like, where trains may enter an advance section from several different points, the various levers of the different signals would be separately locked, but would be controlled by one advance instrument. It being possible for the signals to be repeatedly operated, as hereinbefore described, a safeguard is necessary to prevent one signal being substituted for another without the consent of the advance signalman or to prevent the possibility of two trains being allowed to enter an advance section by error. Figs. 5 and 10 illustrate the mechanism and system of circuits we employ for this purpose. Suppose there are three different points from which trains may be admitted to an advance section. There would be three signal-levers separately locked. Each lock would be fitted with two springs Q, as shown in Fig. 5, which would be worked by armature N, as hereinbefore explained with reference to Figs. 2 and 3. Fig. 10 shows these three sets of springs diagrammatically, No. 1, No. 2, and No. 3 being located in three separate locks, each set being arranged as shown in Figs. 2 and 3. Each lock is also provided with a spring $Q^2$ $q^2$; but for clearness these springs $Q^2$ have been omitted from Fig. 10. The springs Q Q, Fig. 5, are identical with the springs Q Q', Fig. 10, and one pair of these springs being in each of the three locks whichever lock is operated that particular pair will take up the position shown in Fig. 3, and contact will therefore be broken at the points Q and $q$ and will not be made again at these points till a current is passed through the coils M, as hereinbefore explained. In this arrangement the battery, conductors, and relay are the same as those shown in Fig. 14 and other figures, the circuits being identical with the exception of the arrangement of springs Q and Q', the circuits being arranged as follows: a battery 11, Fig. 10, with one pole to earth, the other passing by conductor 13 to the bottom contact-point of No. 1 pair of springs Q. If contact is made at this point, a current passes out of the top of the spring Q to the next lock and bottom contact-point of the No. 2 spring Q, and so on throughout the series. Normally springs Q Q' are in contact with their points Q $q'$, so that there is a closed connection between the spring Q of the last pair and the battery 11 through the intermediate springs Q, and the spring Q' of the first pair is normally in contact, through the intermediate springs Q', with the relay and earth, as shown. When contact is made at C at any signal, the magnet H is magnetized and the circuit cannot be closed through the magnet H of any other signal. The disconnected ends of wire shown at the top of Q' No. 1 and the top of Q No. 3 indicate that more pairs of springs may be included in the arrangement, if desired. The small independent circuit $13^a$ appertaining to each pair of springs passes from bottom contact-point of spring Q to coils H, which would be located in the same lock as the springs Q and Q', to which they are connected, then to contact-maker C, linked by catch-spring of lever, as per Fig. 14, where contact is normally broken, from contact C to bottom contact-point of spring Q', Fig. 10, (instead of going direct to the relay, as in Fig. 14,) there to connect with $13^b$, which in this case runs as follows: Commencing at the top of spring Q' No. 1, out at the bottom to the next lock, entering the top of No. 2 Q', and so on throughout the series, leaving the last of the locks by No. 3 spring Q', then by conductor $13^b$ to the relay, which, if deflected by the "line clear" current, will complete the circuit, as previously explained by Fig. 14. It will be seen that if contact be made at either of the points C a current would pass from the battery-conductor Q 13 to the conductor Q' $13^b$ through coils H, missing the pair of springs where contact is made, but passing through either Q or Q' of each of the others and in no case passing through both of the springs of one lock, these springs being insulated from each other. For instance, should contact be made at C of No. 2 pair of springs a current would pass from the battery 11 through the Q spring of No. 1 pair, miss the No. 2 pair, but traverse from one contact at bottom of spring Q to contact of Q', (passing through the coils H and contact C, as hereinbefore explained,) and thence to the relay through the No. 3 spring Q' by $13^b$. Should contact be made at C of No. 3 pair of springs, a current would pass from the battery 11 by conductor 13 through the Q springs of Nos. 1 and 2, from the bottom contact-point of spring Q of No. 3 to the coils H of the No. 3 back to the bottom contact-point of the spring Q', and thence to the relay by $13^b$, as previously described with reference to Fig. 14. Suppose there were a great number of locks and one of the center ones were operated, the current would pass through the springs Q of all the locks on the battery side and the springs Q' of all the locks on the opposite side, the one first selected effectually preventing all the others from being used, but retaining the freedom hitherto explained of itself being repeatedly used, if necessary.

Our invention is applicable to what is technically known as "point-locking," the object being to prevent a signalman accepting a train while shunting operations are going on or, on the other hand, to prevent shunting operations from being resumed after a train has been accepted.

Our invention can also be worked in connection with "advance subsections," the signalman in this case being compelled to record the entry of every train. Otherwise the rear section must remain blocked.

Our improved device can be connected so that outlying points, gate, &c., may be controlled from the signal-cabin.

The instrument illustrated by Figs. 11, 12, and 13 is used instead of the relay Y when advance subsections are used, and it is for the purpose of controlling the entry of trains into such subsections and also to indicate their presence or otherwise. The instrument contains a contact-point $k'$, connected with the local lock-circuit, and a contact-point $k^2$, connected with the controlling-circuit, a spring $l'$ completing one or the other of the circuits, according to the position of a lever $m'$, carrying the indicator-dials and operated by a handle $n$, Fig. 11. When the advance subsection is clear, contact would be made at $k'$, (which is equivalent to the point $y$ of relay Y, Fig. 14,) closing the local lock-circuit and enabling the signal-lever to be operated as before explained in connection with Fig. 14. When the instrument indicates "clear," all signals admitting to the subsection will be free. When a train enters the subsection, the signalman must operate the instrument by the handle $n$, so that the indication-dial reads "blocked" through the aperture $o$ in the front of the instrument, the signalman in this case being compelled to record the entry of every train. Otherwise the rear section must remain blocked. With the instrument in the position indicating "blocked," contact is made at point $k^2$, thereby completing the local controlling-circuit and releasing the handles or dial of the signaling instrument, as previously explained in connection with Fig. 14. The indicator-dial would be held in this position by the pawl or catch $k^{10}$ till such time as a circuit is passed through an electromagnet substantially as described in reference to Fig. 7. The spring $l'$ is in direct contact with the earth the same as the armature of the relay Y. $p$ $p^2$ are stops to regulate the movement of the lever or cam $m'$.

The springs T, Fig. 6, can be used for the purpose of intercepting currents in the local lock and controlling circuits, so as to prevent the signalman (while using his own instrument) from affecting in any way either of these circuits, as no current can pass through the springs T from the pillar V except when the handle of the instrument is in a perpendicular position.

By the ordinary mechanical methods of interlocking the position of the various point and signal levers only are determined, the position of the corresponding points, signals, &c., being left to mere chance. Should the point-rods break or signals hang off, complications may arise which may lead to grave disaster. This defect is recognized and various appliances are made use of to overcome the difficulty—such as point-detectors, &c.—these acting in conjunction with the mechanical interlocking of the frame.

By attaching one of our contacts, Fig. 8, to the various points, signals, &c., affected and by fixing to the various levers one of our locks, or two, where back locking is required, (the controlling portion of the mechanism being omitted,) a system of interlocking is provided, which, in addition to the usual safeguards, will insure that the point-signals, &c., operated shall be in a perfect position corresponding with their respective levers before conflicting levers or the like can be moved. By making use of springs L, Fig. 2, and the novel arrangements of circuits illustrated by Fig. 10 whole frames and signaling-stations on this principle can be fitted up with a most effective and complete interlocking apparatus. The special form of contact shown in Fig. 8 can also be used for obtaining electrical contacts by the deflection of the rail for the purpose of signaling the approach of trains generally, and the cam $e$ may be made to operate several pair of levers $g$ and $g^2$, if desired.

We claim as our invention—

1. In a locking apparatus for use on railways, the combination of an operating-lever and a locking-bar in operative connection therewith, blocks provided with locking-surfaces, a tumbler pivoted between the blocks, and engaging the said locking-bar, with a block for engaging the tumbler and locking-surfaces, the said block having a movable bearing, and an electromagnet to release the block from the tumbler and locking-surfaces, substantially as set forth.

2. In a controlling apparatus for use on railways, the combination of an operating-lever, an electrical contact made and broken by the operating-lever, a sending instrument, a relay on the sending instrument, a battery and conductors connecting the battery with the contact and a contact of the relay, with a receiving instrument, a locking-bolt therefor, a catch for the bolt, and an electromagnet for releasing the catch and a gravity-latch for supporting the catch when so released, substantially as set forth.

3. In a locking apparatus for use on railways, the combination of a locking-bar and a tumbler for engaging therewith, means for locking the said tumbler, an electromagnet M, a contact device operated by the electromagnet, a catch-lever for locking the said contact device, and a projection in operative connection with the tumbler for disengaging the catch-lever from the contact device, with a battery and conductors connecting the battery with the contact device and electromagnet, substantially as set forth.

4. In a locking apparatus for use on railways, the combination of the lock-circuit and the controlling-circuit, with a contact $k'$ connected with the lock-circuit, a contact $k^2$ in connection with the controlling-circuit, a spring $l'$ for completing one or other of the circuits, a projection on the spring, an indicating dial or sector provided with a weight to retain it in its normal position indicating "line clear," an engaging surface on the dial or sector with which the said projection engages when the sector is moved to indicate "line blocked," substantially as set forth.

5. In a locking apparatus for use on railways, the combination of blocks provided with locking-surfaces, a tumbler pivoted between the blocks, an electromagnet provided with an armature, movable bearings for the pivots of the armature, a block depending from the armature, normally engaging the locking-surfaces of the blocks, a circuit for actuating the said electromagnet, with a tappet or locking-bar with which the tumbler normally engages, an operating device connected to the tappet or locking-bar, an arm or extension on the said armature of the electromagnet and springs operated by the said arm or extension to make and break other electric circuits, as and for the purposes described.

6. In combination with a locking apparatus for use on railways of a controlling device comprising an electromagnet, a battery in connection therewith, a spring-contact operated by the armature of the electromagnet, a catch or lever normally preventing the movement of the armature, with a projection in operative connection with the lock-operating lever for releasing the armature from the said catch, and a contact-point in connection with the controlling-circuit with which the spring-contact is caused to engage when the armature is released, substantially as described.

7. In combination with a plurality of electromagnetic locking and controlling devices for use on railways, electromagnets M, spring-contacts arranged in pairs, and operated by the armatures of the said electromagnets, levers P operated by the said locking mechanisms, and circuits in connection with the spring-contacts, whereby the passage of current to or from any number of locking devices can be intercepted, substantially as hereinbefore described.

8. In a signal-receiving instrument for use on railways, the combination of a locking-bolt for the handle of the instrument, a catch for the bolt, an electromagnet excited by a current from an adjacent station for releasing the catch, and a gravity-latch for supporting the catch when so released, substantially as described.

9. In combination with locking devices for use on railways, an electric contact maker and breaker comprising a cam with flattened surfaces, levers resting against the cam and spring-contacts acted upon by the levers to complete or break the circuit of the locking device, substantially as hereinbefore described.

In testimony whereof we have signed our names to this specification in the presence of two subscribing witnesses.

JAS. F. W. MORRIS.
G. MUMFORD.

Witnesses:
RUDOLPH CHAS. NICKOL,
PERCY R. GOLDRUY.